(12) United States Patent
Dolub

(10) Patent No.: US 7,363,853 B2
(45) Date of Patent: Apr. 29, 2008

(54) DEVICE FOR CRACKING OPEN AND SEPARATING AN EGG

(76) Inventor: Carlos Alberto Dolub, Tzahal Street 21, Carmiel (IL) 21702

( * ) Notice: Subject to any disclaimer, the term of this patent is extended or adjusted under 35 U.S.C. 154(b) by 473 days.

(21) Appl. No.: 10/477,975

(22) PCT Filed: May 9, 2002

(86) PCT No.: PCT/IL02/00363

§ 371 (c)(1),
(2), (4) Date: May 7, 2004

(87) PCT Pub. No.: WO02/091893

PCT Pub. Date: Nov. 21, 2002

(65) Prior Publication Data

US 2006/0156932 A1    Jul. 20, 2006

(30) Foreign Application Priority Data

May 17, 2001    (IL) .................................... 143189

(51) Int. Cl.
*A47J 43/14* (2006.01)
(52) U.S. Cl. ............................. 99/568; 99/577; 99/582
(58) Field of Classification Search ................ 426/614, 426/478; 99/499, 500, 568, 577, 578, 582
See application file for complete search history.

(56) References Cited

U.S. PATENT DOCUMENTS

| | | | | |
|---|---|---|---|---|
| 2,589,408 A * | 3/1952 | Le Boeuf | ..................... | 99/582 |
| 4,068,573 A * | 1/1978 | Romero | ....................... | 99/578 |
| 4,137,837 A * | 2/1979 | Warren | ........................ | 99/499 |
| 4,542,584 A * | 9/1985 | Talbot | ....................... | 30/120.1 |
| 5,083,508 A * | 1/1992 | Banks et al. | ................... | 99/577 |

* cited by examiner

*Primary Examiner*—Anthony Weier
(74) *Attorney, Agent, or Firm*—Klehr, Harrison, Harvey, Branzburg & Ellers, LLP

(57) ABSTRACT

The invention relates to a device for cracking open an egg wherein the device grips said egg, penetrates the shell of said egg, and opens the shell of the egg to release the contents therein.

3 Claims, 2 Drawing Sheets

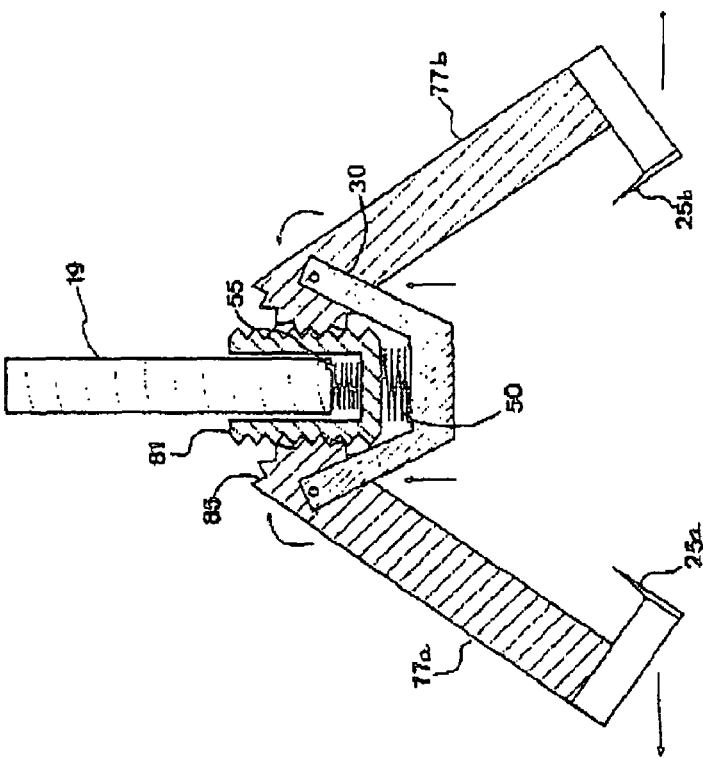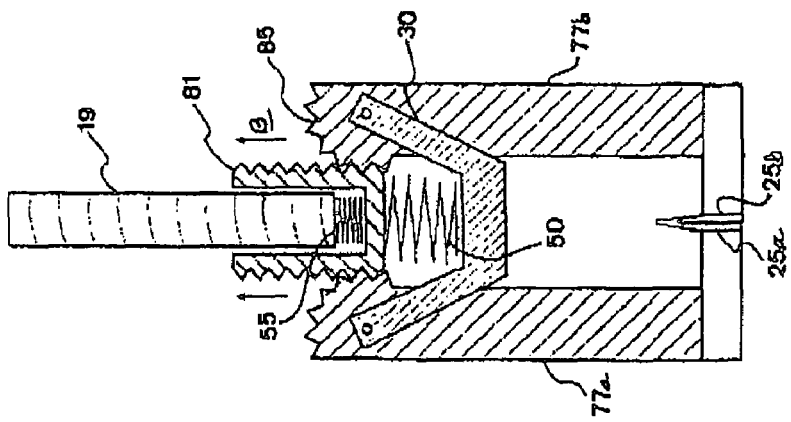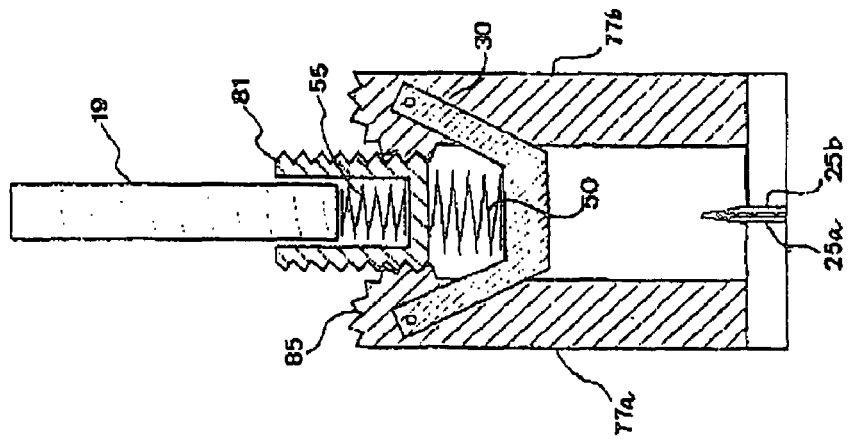

DEVICE FOR CRACKING OPEN AND SEPARATING AN EGG

FIELD OF THE INVENTION

The present invention relates to the field of kitchen utensils. More specifically, the present invention relates to an improved method for cracking open an egg to obtain the contents therein and for separating the yolk of the egg from the white. The invention further relates to a device for carrying out said method.

BACKGROUND OF THE INVENTION

It is sometimes difficult and messy to crack open and egg, and, moreover, to separate the yolk of the egg from the white. Various egg-separating devices are known in the art that facilitate performance of this task including, U.S. Pat. No. 4,068,573 to Romero, U.S. Pat. No. 4,665,813 to Maisonneuve, and U.S. Pat. No. 5,083,508 to Banks et al.

None of the egg-crackers currently available satisfactorily perform the job of cracking open and separating an egg. A device for cracking open an egg should make said task easier to perform, not harder. Instead, many devices cause the yolk to break, are messy, and are awkward for the user to handle.

The present invention relates to a device for cracking open an egg that is both simple to use and reliable. The device of the present invention employs a three-stage process, comprising gripping the egg, cracking the shell of the egg, and separating the shell of the egg so that the contents inside fall into a receiving vessel. The receiving vessel may be any container employed by the user to receive the contents of the egg. Alternatively, the device has a removable cup adapted in size and shape for receiving the yolk of the egg while the white falls to a receiving vessel positioned underneath the device.

SUMMARY OF THE INVENTION

The present invention relates to a method for cracking open and egg to obtain the contents therein and for separating the egg yolk from the white (if desired) and to a device for use in carrying out said method. The device is adapted for cracking open an egg in three simple steps, leading to mess-free, and convenient opening of an egg without pieces of the shell remaining in the white or the yolk and without breakage of the yolk. The device is suitable for eggs of all different sizes. It will become evident from the description provided that the present invention provides an egg-cracking device far superior to those already known in the art both in its simplicity of use and in its efficiency.

The present invention relates to a method for cracking open an egg using a device for cracking open and separating an egg, comprising, (One) placing an egg into a predetermined position in said device;

(Two) gripping said egg (by said device);

(Three) penetrating the shell of said egg in a predetermined manner;

(Four) opening the shell of said egg so as to release the contents therein;

According to preferred embodiments of the present invention, the method further comprises the step of separating the yolk of the egg from the white of the egg.

Furthermore according to preferred embodiments of the present invention, the step of penetrating the shell of the egg is accomplished by two piercing members positioned adjacent to one another.

Moreover according to preferred embodiments of the present invention, the step of opening of the shell occurs when said piercing members are moved away from one another.

The present invention also relates to a device for cracking open an egg comprising an upper handle and a lower handle for grasping and operating the device, holding means for holding an egg to be cracked in a predetermined position, and gripping, penetrating, and opening mechanism coupled to the handles and the holding means, for gripping said egg, for penetrating the shell of said egg, and for opening said shell so as to release the inner contents of the egg. The gripping, penetrating, and opening mechanism comprises;

(One) a first arm and second arm, wherein the arms are movable between a first position wherein the said arms are substantially parallel to one another and a second position wherein the arms are angled with respect to one another;

(Two) moving means for moving the first and second movable arms from the first position to the second position, wherein the moving means are actuated by the pushing together of the handles by a user;

(Three) a first piercing member and second piercing member protruding from the first and second movable arms, respectively, the first and second piercing members being positioned adjacent to another when the arms are in the first position, and the piercing members moving apart from one another when the arms are moved to the second position;

The piercing members are positioned at a location directly below the holding means such that when an egg is positioned inside said holding means, the egg will be gripped, penetrated, and opened as the handles are pushed together.

According to preferred embodiments of the present invention, the holding means comprises a first ring and a second ring. The first and second rings are attached, at their lower ends, to the first and second movable arms, respectively.

Moreover according to preferred embodiments of the present invention, the device further comprises a protruding element positioned at the proximal end of the lower handle for facilitating gripping of the egg by the device.

Additionally according to preferred embodiments of the present invention, the device further comprises a cup positioned below the holding means for receiving the yolk of an egg following opening of the egg.

BRIEF DESCRIPTION OF THE DRAWINGS

The invention is now described, by way of example only, with reference to the accompanying drawings, wherein:

FIGS. 2A, 2B, and 2C are partial frontal views of the device of the present invention, showing steps occurring in a method for cracking open and separating an egg, according to a preferred embodiment of the present invention.

DETAILED DESCRIPTION OF THE DRAWINGS

Figure 1:
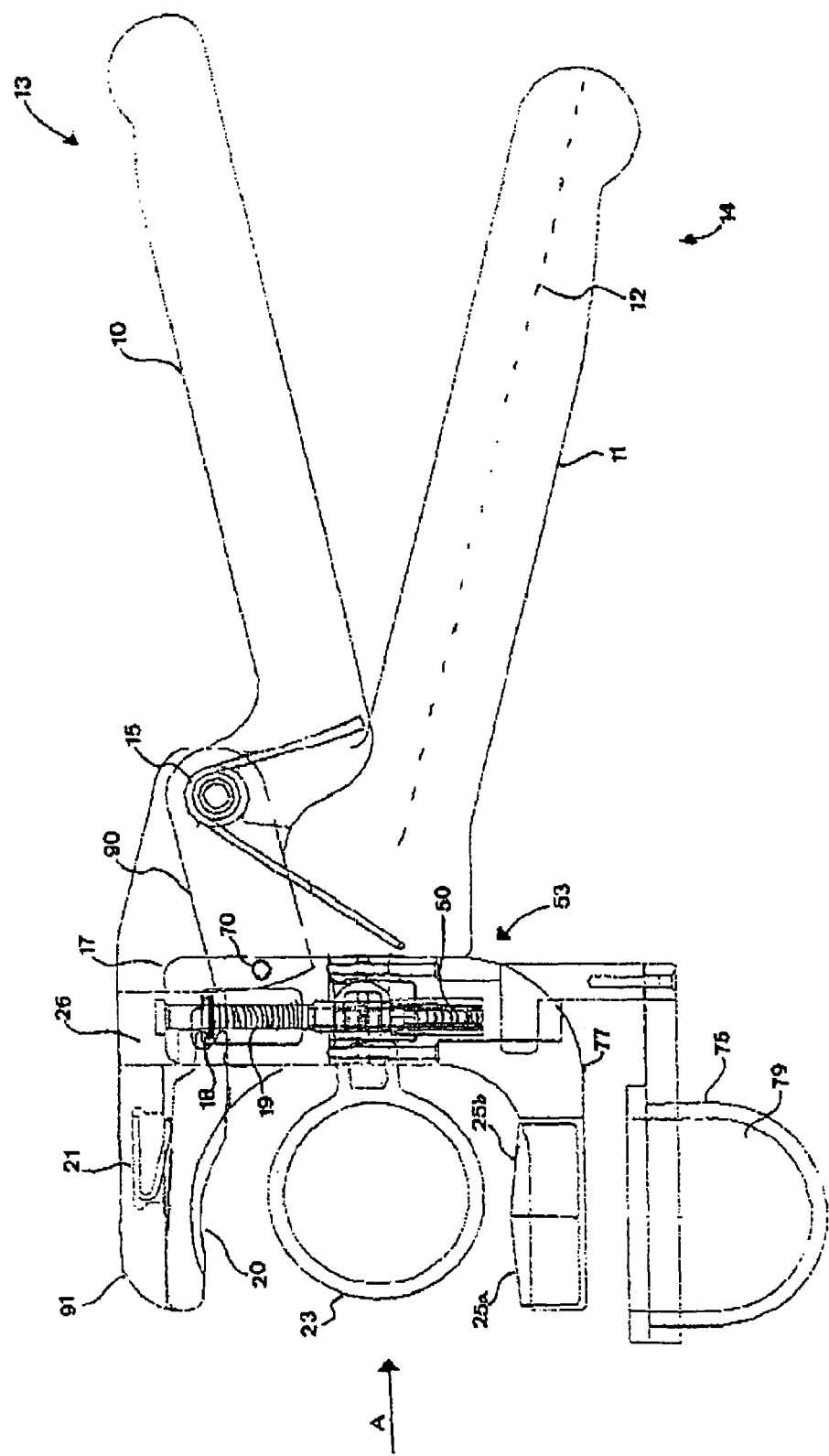
FIG. 1 is a side schematic view of a device for cracking open an egg, according to a preferred embodiment of the present invention.

It is appreciated that the detailed description provided is intended only to illustrate and elucidate certain preferred embodiments of the present invention. It is in no way meant to limit the scope of the invention, as set out in the claims.

Referring first to FIG. 1, the device of the present invention includes an upper handle (10) and a lower handle (11) for allowing gripping for operation of the device. The distal regions (13) (14) of the handles are designed to be gripped and pushed together by the user. The width of the lower handle (11) has a longitudinal depression (indicated by dotted line 12) on the upper surface thereof for receiving the upper handle (10) when said handles are pushed together. The proximal end (90) of the upper handle (10) is positioned inside the end region of said longitudinal depression and moves in the upward direction when the handles are pushed together by a user. The handles (10) (11) are pivotally connected to one another by pivot mechanism (15).

The proximal end (90) of the upper handle (10) is connected to a gripping, penetrating, and opening mechanism (53) via a screw mechanism (70). The central portion of the gripping, penetrating, and opening mechanism (53) contains a main screw (19), a screw housing (17), a protruding element (20), and a catch element (18). The catch element is engaged around the main screw (19) and prevents movement of said main screw (19) during penetrating, and opening of an egg. When the handles are gripped and pushed together by a user, the proximal end (90) of the upper handle (10) is raised, thereby causing the screw housing (17) to be raised in a corresponding manner. The mechanism (53) further includes a first arm (77) attached on one side of the bottom portion of the screw housing (17) and a second arm (not seen in FIG. 1) attached on the other side of the bottom of the screw housing. The arms preferably have a curved design, as shown in the illustration. Said arms are attached to the screw housing (17) in an outwardly rotatable manner that allows the arms to move from their initial, parallel alignment with respect to one another ("first position"), to an angled alignment ("second position"), as to be described further.

The lower portion of each arm contains an upwardly extending piercing member (25a) (25b). When the arms are in parallel alignment with one another, the piercing members are adjacent to one another and function to penetrate the shell of the egg in a manner to be described. When the arms are rotated outwardly, the piercing members move away from one another. This causes opening of the egg.

A first ring (23) and a juxtapositioned second ring (not seen in FIG. 1) are connected to the gripping, penetrating, and opening mechanism (53) and serve to hold an egg to be cracked in a predetermined position. The rings are preferably comprised of flexible material so as to accommodate eggs of varying sizes. The rings may be attached to the gripping, penetrating, and opening mechanism (53) at any location on the arms. As an example, in FIG. 1, ring (23) is attached to the vertically-extending section of arm (77). In other embodiments, said ring (23) may be attached to the lower, horizontally extending section of the arm (77). When the arms are rotated outwardly from the first position to the second position, the rings rotate in a corresponding manner to cause the release of the inner contents of the egg.

The device further comprises a protruding element (20) that protrudes from the lower surface of the proximal end of the lower handle (11). Said protruding element is coupled to the catch element (18) by a flexible member (21). When the handles are pushed together such that the protruding element (20) is brought in contact with the egg, the egg forces the protruding element (20) to shift position in the upward direction. The protruding element (20) then presses against the flexible member (21), thereby causing the catch element (18) to switch from an initial horizontal position to a diagonal position, and preventing movement of the main screw (19).

In some preferred embodiments, the device also comprises a cup (79) that is positioned below the arms and the rings. The cup (79) is preferably removably connected to the screw housing (17) at a portion of said screw housing that extends in the downward direction between the two arms. Said cup (79) is attached by any appropriate means, such as attachment member (75). The screw housing has an opening for receiving the end portion of said attachment member. The cup (79) is preferably used when the yolk of the egg needs to be separated from the white. In this case, following opening of the shell of the egg, the egg yolk falls into the cup while the egg white falls into a receiving vessel positioned below the device by the user.

FIGS. 2A, 2B, and 2C show partial frontal views of the device of Figure, from the vantage point of arrow (A) of FIG. 1, with some components eliminated from the device for the purposes of clarity so as to enable explanation of the gripping, penetrating, and opening mechanism of the device. In particular it should be noted that the ring member and the screw housing are not shown in these Figures. The first arm (77a) and the second arm (77b) can be viewed along with the first piercing member (25a) and the second piercing member (25b) positioned at the lower portion of the arms (77a) (77b). In the embodiment shown, the arms (77a) (77b) are connected to one another by a connecting member (30). The main screw (19) of the gripping, penetrating, and opening mechanism can also be seen. The main screw (19) is positioned inside a toothed comb (81) that facilitates movement of the arms. The main screw (19) is coupled to the toothed comb (81) via a first spring (55). During operation of the device, upward movement of the screw housing (17) results in the downward force of the main screw (19) onto the first spring (55), so as to cause said spring (55) to change from a substantially expanded position (FIG. 2A) to a substantially compressed position (FIG. 2B). At the upper end of each arm (77a) (77b) is a toothed surface (85) that, along with a second spring (50) connected between the connecting member (30) and the toothed comb (81), facilitates outward rotation of the arms (77a) (77b).

Reference will now be made to FIG. 1 in combination with FIGS. 2A, 2B, and 2C, and to a method for cracking open and separating an egg. During operation of the device of the present invention, the user first places an egg to be cracked into position inside the two ring members. Each ring member is engaged around one end of the egg, leaving the central portion of the egg free for allowing penetration of the egg shell. When thus positioned, the egg is located directly above the piercing members (25a) (25b). Only one motion of pushing together the handles (10) (11) of the device is needed for completing cracking open and separating of an egg. However, since three events take place during this one motion, these three events will be described separately.

The first step that takes place when the user pushes the handles (10) (11) together is that all the components of the gripping, penetrating, and opening mechanism (53) move in the upward direction, with the exception of the catch element (18), which is prevented from moving due to openings on either side of the proximal end (91) of the lower handle (11) that engage said catch element (18). The main screw (19) as well as the screw housing (17) move upward through an opening (26) in the proximal region of the lower handle (11). This movement stops when the egg contacts the protruding element (20) located at the lower surface of proximal end (91) of the lower handle (11). When this happens, the force of the egg causes the protruding element (20) to shift upward slightly, which in turn causes the catch element (18) to move from its initial horizontal position to a diagonal position. Since the catch element (18) is engaged around the main screw (19), the diagonal repositioning of the catch element (18) prevents further movement of the main screw (19). At this stage, the egg has become gripped by the device. At this time, the components of the gripping, penetrating, and opening mechanism are in the configuration shown in FIG. 2A.

In the next stage, the screw housing (17) (as well as the arms and the rings, but not the main screw) continues to move in the upward direction (for a distance of about 3 mm, depending on the size of the spring (55) used), thereby causing the piercing members (25a) (25b) to penetrate the bottom of the shell of the egg. During this step, the upward movement of the screw housing (see arrow B of FIG. 2B) results in the compression of first spring (55) due to the force of the main screw (19) on said spring (see FIG. 2B). After the spring (55) is maximally compressed, the screw housing (17) cannot move upward anymore.

In the final stage, continued pressing together of the handles (10) (11) causes upward movement of the toothed surfaces (85) of the arms along the toothed comb (55). This movement results in the outward rotation (from the first position to the second position) of the arms (77a) (77b). FIG. 2C illustrates the arms in the second position. The piercing members (25a) (25b) separate from one another, causing opening of the egg and the release of the inner contents of the egg. When the cup (25) is in place, the yolk of the egg falls into the cup while the white falls into another receiving vessel positioned under the device by a user. Without the cup, the yolk and the white fall into the same receiving vessel.

The invention claimed is:

1. A device for cracking open an egg comprising handles for grasping and operating said device, holding means for holding an egg to be cracked in a predetermined position, and gripping, penetrating, and opening mechanism coupled to said handles and said holding means, for gripping said egg, for penetrating the shell of said egg, and for opening said shell so as to release the inner contents of the egg, wherein said gripping, penetrating, and opening mechanism comprises;

(a) a protruding element coupled to a catch element for switching the position of the catch element when the protruding element is brought in contact with the egg, thereby accomplishing a first stage of operation and preventing further movement of a main screw;

(b) a spring configured to be compressed against the main screw which has become immovable in the first stage, the spring's size determines a distance of movement of a pair of arms having piercing members, thereby causing the piercing members to penetrate the bottom of the shell of the egg in a second stage of operation; said arms are configured to rotate outwardly and to separate the piercing members from one another thereby causing opening the egg in a final stage of operation.

2. A device according to claim 1, wherein the holding means comprises a first ring and a second ring, wherein said first and second rings are attached, at their lower ends, to said first and second movable arms, respectively.

3. A device according to claim 1, further comprising a cup positioned below said holding means for receiving the yolk of an egg following opening of said egg.

* * * * *